Figure 1:
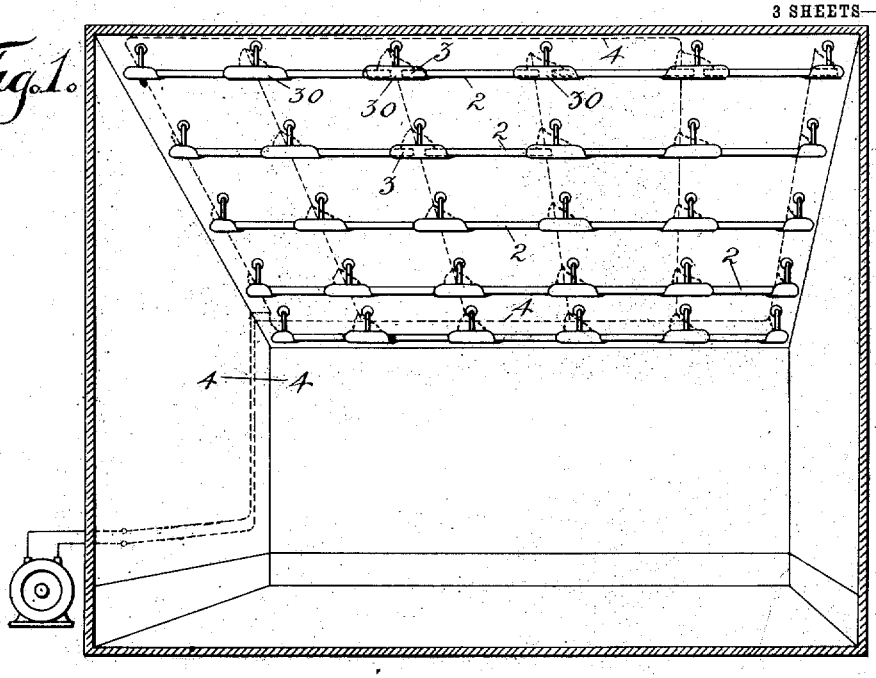

No. 12,561. REISSUED NOV. 20, 1906.

D. McF. MOORE.

ELECTRIC TUBE LIGHTING.

APPLICATION FILED NOV. 19, 1903.

3 SHEETS—SHEET 1.

WITNESSES:

C. O. Tischner Jr.

E. L. Lawler

INVENTOR

Daniel McFarlan Moore

BY

Townsend & Decker

ATTORNEYS

No. 12,561. REISSUED NOV. 20. 1906.

D. McF. MOORE.

ELECTRIC TUBE LIGHTING.

APPLICATION FILED NOV. 19, 1903.

3 SHEETS—SHEET 2.

WITNESSES:

C. Gischne Jr.

E. L. Lawler

INVENTOR

Daniel McFarlan Moore.

BY

Townsend & Decker

ATTORNEYS.

No. 12,561. REISSUED NOV. 20, 1906.

D. McF. MOORE.

ELECTRIC TUBE LIGHTING.

APPLICATION FILED NOV. 19, 1903.

3 SHEETS—SHEET 3.

WITNESSES:

A. G. Fischner Jr.

E. L. Lawler

INVENTOR

Daniel McFarlan Moore.

BY

Townsend & Decker

ATTORNEYS

UNITED STATES PATENT OFFICE.

DANIEL McFARLAN MOORE, OF NEWARK, NEW JERSEY, ASSIGNOR TO MOORE ELECTRICAL COMPANY, OF NEW YORK, N. Y., A CORPORATION OF NEW YORK.

ELECTRIC-TUBE LIGHTING.

No. 12,561. Specification of Reissued Letters Patent. Reissued Nov. 20, 1906.

Original No. 702,315, dated June 10, 1902. Application for reissue filed November 19, 1903. Serial No. 181,866.

*To all whom it may concern:*

Be it known that I, DANIEL McFARLAN MOORE, a citizen of the United States, and a resident of Newark, in the county of Essex and State of New Jersey, have invented a certain new and useful Improvement in Electric-Tube Lighting, of which the following is a specification.

My present invention relates to a novel system of electric lighting involving as one of the constituents thereof light produced by means of electric energy supplied to the terminals of a gaseous column or body contained in a translucent receptacle.

The object of my invention is to avoid the use of electric conductors for distributing the electrical energy to the lamps or light-giving portions of the system and to thereby permit the illumination of buildings and contained areas without the presence of conducting-wires, of copper, distributed through the building or the rooms thereof or around, over, or through the space to be lighted and conducting electric energy converted into light into a number of separate or distinct spots or points.

Briefly stated, my invention consists of an improved electric-lighting system for distributing electric energy and illuminating areas or spaces thereby and involving the conversion of the electric energy into a luminous column of gas or vapor which is distributed or conducted as a luminous column over, around, or through the spaces to be illuminated in contradistinction to distributing the current and at local points converting it into areas of light more or less localized.

In the practical installation of my present system the translucent tube of glass could be built up *in situ* in the position it is to occupy while in use or could otherwise be distributed as a tube of glass over the spaces to be illuminated, and its terminals, which are provided with the suitable energy-transferring electrodes or caps, would be brought to a protecting-cabinet or wall-pocket or other suitable inclosure in which they would be connected to the two poles of the energy-supplying devices, which latter might be mains or wires leading direct from the primary generator of electromotive force or might be terminals of a suitable transformer adapted to give the required voltage at its secondary. In practice and for the preferred form or character of the lamp I would utilize alternating electric currents of greater or less voltage, as might be found desirable. For illuminating the interior of a dwelling or structure the portions of the glass tubing which contain the luminous column from which the effective illumination is obtained could be distributed in any desired way throughout the whole interior of the dwelling or structure, as one or more tubes with the conducting-caps or other suitable energy-transferring terminals thereof brought from within the illuminated spaces or areas to an exterior cabinet or receptacle, where its conducting-caps would be located out of harm's way and in immediate connection with the source of energy, or, if desired, the energy might be carried into the building and suitable transforming devices located in sealed wall-pockets or other suitable protective box or inclosure within which the high potential is permanently retained, the conducting terminals of the tube being in immediate connection therewith and similarly protected against accidental contact, while the non-conducting translucent portion of the tube containing a luminous gas would project from the protective inclosure and extend over or through the areas or spaces to be lighted, being distributed in any desired form or manner therethrough.

While my invention may be carried out with any form of lamp having the characteristics above described—to wit, a translucent receptacle and energy-supplying electrode at the terminals or near the terminals of the luminous column—it is for some reasons preferable to use a form of lamp previously devised by me and consisting, essentially, of a translucent tube whose conducting terminals or electrodes are caps or sheets of graphite attached closely to the exterior of the tube and transferring their energy by electrostatic action to the contents of the tube itself.

Among the advantages attained by the present system of electric lighting are the following: First, ability to secure complete absence of fire risk, even when the lamp is operated by high voltages, since it is not necessary to have any metallic conductors within the areas or spaces where danger from fire may exist; second, great economy in installation and in efficiency or consumption of power, owing to the fact that the number of electric fixtures required for holding and supplying energy to the terminals of the tube is reduced to a minimum, thus decreasing the cost for fixtures alone, also to the fact that the proportion of cap to length of luminous column is very greatly reduced when the energy-transferring terminals consist of external electrodes which transfer their energy by electrostatic action to the contents of the tube. The advantages of my invention, so far as concerns the latter feature, will be obvious from the following consideration: In tube-lighting, as heretofore practiced by me, I have employed tubes which at a maximum would be, say, from seven to eight feet long, that being the largest in size which could be manufactured, manipulated, and installed with convenience. With tubes of such length and employed in sufficient numbers to illuminate a space of any considerable size a large number of fixtures would be employed, and, moreover, the conducting-cap placed upon the tube, if of length sufficient to transfer the proper amount of energy and to secure the desired density of light, would very largely obscure the actual light-giving column, so that almost half of the total length of the tube might be non-luminous. Moreover, in the case of lamps having exterior conducting caps or terminals the total resistance of the lamp is made up of two elements—namely, the resistance at the caps and the resistance of the gas itself. The resistance at the caps is very large and prevents the tubes from having a high efficiency, because this resistance is non-luminous. In my present invention this element of resistance becomes a factor of less importance because a greater value is given to the other factor—namely, the resistance of the luminous column, which is the efficient energy-consuming portion of the lamp because it produces the light.

Figure 2:
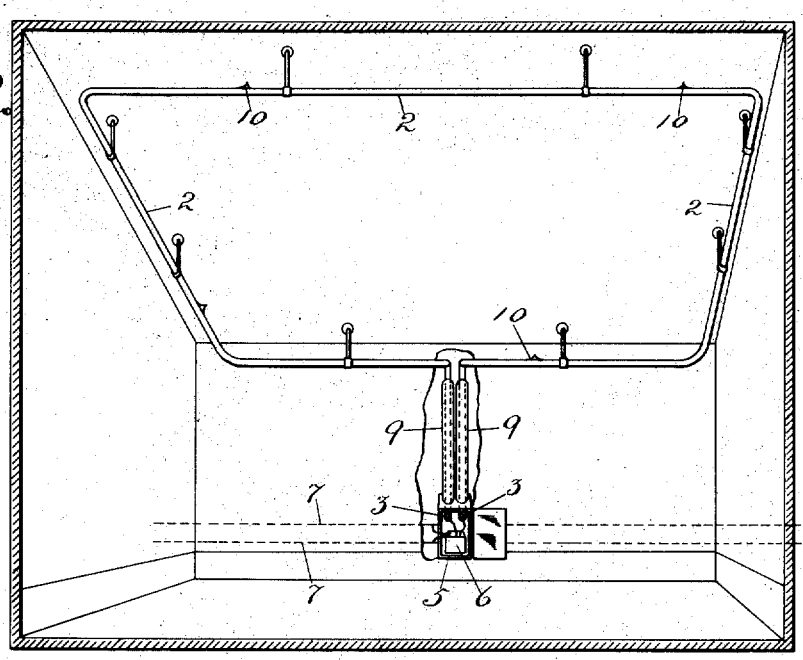
Figure 3:
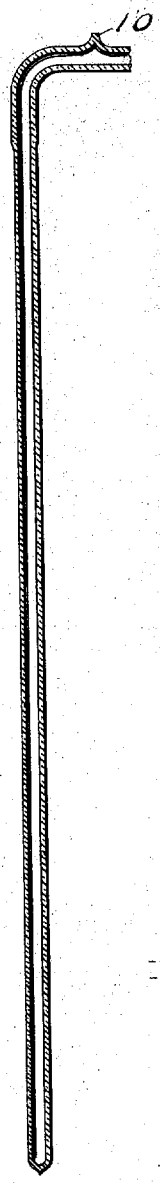
Figure 4:
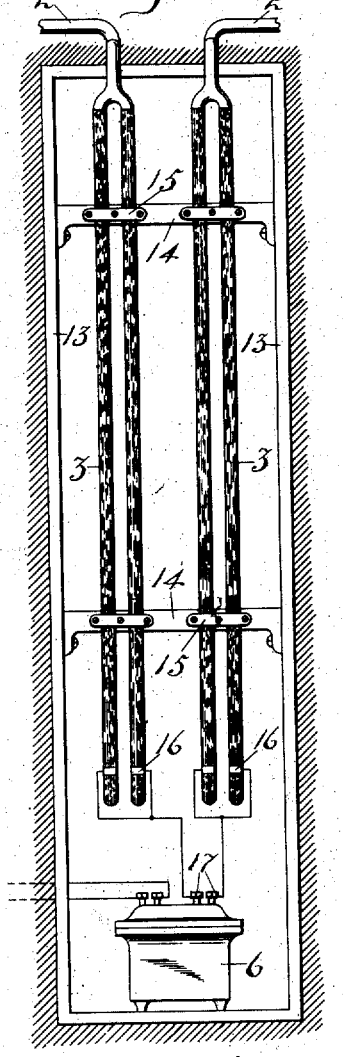
Figure 6:
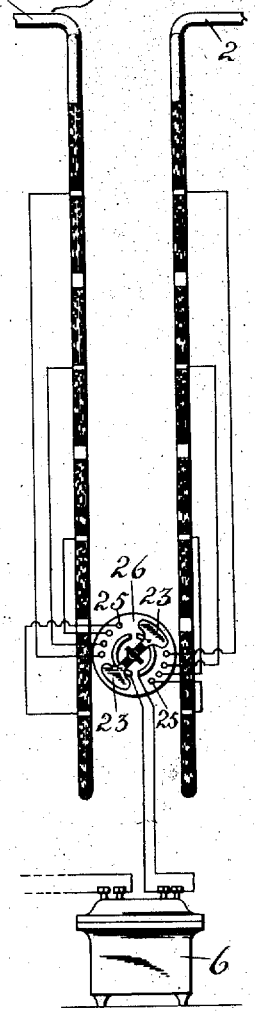
Figure 5:
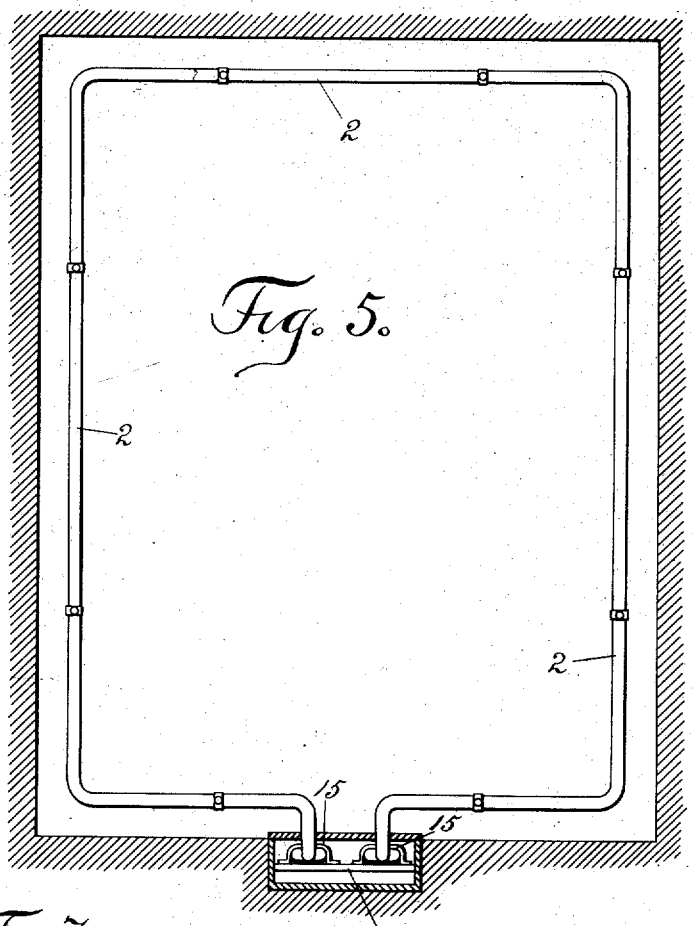
Figure 9:
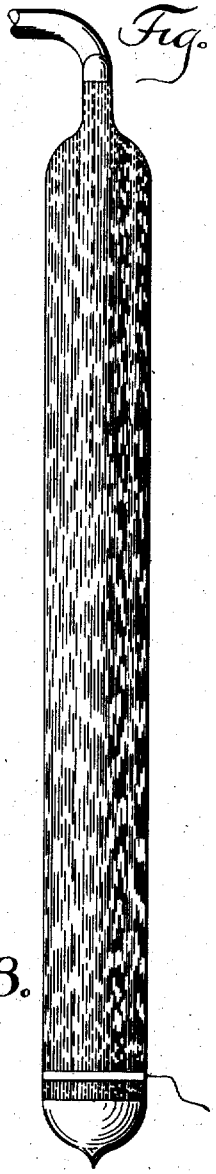
Figure 7:
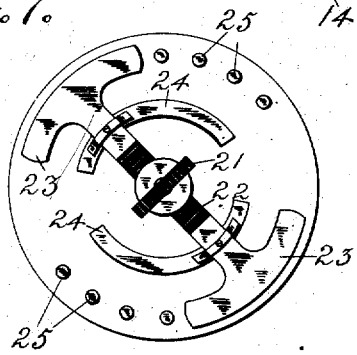

In the accompanying drawings, Figure 1 illustrates in skeleton perspective the system of lighting heretofore employed by me and shows a room or space of considerable area illuminated by a number of lighting-tubes of the character heretofore used by me. Fig. 2 illustrates in skeleton the principle of my present invention by showing the manner in which the same area would be illuminated by a single tube extending around the sides of the area or space and terminating at a suitable wall-pocket or other inclosure in caps or other terminals attached to a source of energy, such as the secondary of a transformer supplied from alternating-current mains. Fig. 3 is a longitudinal section of one end of an improved construction of tube. Fig. 4 is a vertical section through the wall or wall-box at one end of the apartment and shows a modification in the construction of tube hereinafter more fully described. Fig. 5 is a plan of a tube as disposed and supported in a room in the manner indicated in Fig. 4. Fig. 6 represents the disposition of the parts at or near the terminals of the tube in elevation and shows also the provision of a sectional cap or electrode. Fig. 7 is an end view, and Fig. 8 a side elevation, of a switch adapted for use with said sectional cap. Fig. 9 represents a modification in the form of the tube at its ends.

Referring to Fig. 1, the area to be lighted is shown as illuminated by means of twenty-five tubes, the visible or illuminating portion of each of which is indicated by the numeral 2, while 3 indicates the conducting caps or terminals, (shown in dotted lines,) which with lamps of the particular kind heretofore invented by me are applied to the exterior of the tube at the ends thereof and furnish to the gaseous contents electric energy for causing the same to emit luminous radiations. The said tubes are supplied with energy by means of distributing-wires 4, which extend over the area to be lighted and are connected through suitable fixtures 30 with the conducting caps or electrodes at the terminals of said tubes. As will be obvious in this system, there are a large number of terminal fixtures and of individual lighting devices, each of which has a number of terminal electrodes consuming electrical energy in the work of transfering energy to the gaseous contents to be rendered luminous. Moreover, in such a system, when caps are used as the energy-transferring electrodes or terminals, a large portion of the total gaseous column is inclosed in the conducting cap or electrode, so that its luminosity is obscured and is not available for any useful purpose. In fact when tubes of as great length as ninety-one inches are employed it will be found that for securing the desired density of illumination with suitable voltage the total length of the caps will be approximately thirty-six inches, and inasmuch as in such a form of lamp practically one-half of the consumption of energy for each lamp is used up in the transfer of the energy to and from the gaseous contents there is a very great total loss of energy in securing efficient illumination of the area indicated. The system, as shown, has other disadvantages in respect to the large number of fixtures necessary, which add to the cost, and also in the fact that the wiring for furnishing the energy is distributed over, around, or through the area or spaces to be illuminated, which is objectionable, particularly with high voltages, on account of fire risks and for other reasons, as well understood in the art of electric lighting, and for other reasons, no matter what voltage may be employed.

In my present invention I take advantage of the fact discovered by me and set out in a copending application for patent that an increase of the length of the visible luminous column in a lamp wherein the illumination is produced by exciting through electric energy the gaseous contents of a tube gives a practically corresponding increase in the efficiency of the lamp, or, in other words, secures a very greatly increased total illuminating capacity for practically the same total expenditure of electrical energy. Fig. 2 shows in skeleton the apartment or interior shown in Fig. 1, illuminated by a tube extending around the sides thereof and terminating at 5 in a suitable wall pocket or box, where it is provided with conducting caps or terminals of sufficient size to supply the requisite amount of energy required for giving a density of light of the desired amount and where it is in direct connection with the source of energy-supply. In the present instance and in one of the preferred ways of carrying out my invention the source of energy-supply is the secondary of a suitable static transformer 6, the primary of which is supplied from mains 7, which may be street-mains extending from a suitable power-house and there connected with a source of alternating currents. By means of the transformer a voltage of any desired amount may be obtained for the excitation of the tubes, such voltage being dependent upon the density of illumination required for each unit of length of the tube, the size of the conducting-caps, the nature of the gaseous contents, and other factors. Ordinarily it is desirable to construct the transformer so as to give at the terminal of the secondary a higher voltage than that on the main 7. It is also desirable to select for the system mains 7 7, having the highest frequency used commercially. My invention, however, does not concern itself especially with frequencies nor with voltages on the mains supplying the energy since, as more fully set forth in my application, Serial No. 86,359, filed December 18, 1901, I have found that using what would ordinarily be termed "very moderate voltages" at the terminals of the tube 2 a very great length of gaseous column may be rendered luminous and that such lengths of luminous tube may be used as will permit large areas to be illuminated, while the source of energy connected to the terminals thereof may be isolated or confined within the protecting-space of a wall-pocket or other device.

Figure 8:
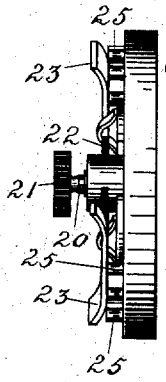

In installing the light-giving device lengths of glass tubing of such dimensions longitudinally as will permit the same to be readily handled may be joined together end to end, by fusing or otherwise, in the position which the illuminating-tube is to occupy when installed. In other words, said tube is built up, installed, and distributed through the spaces to be illuminated in much the same manner as a distributing-wire would be installed for the purpose of supplying the tubes of Fig. 1, the only difference being that on account of the size, fragility, and want of flexibility in the glass tube it is necessary to construct it in sections and *in situ*. A flexible translucent tube of such constitution that could be coiled and strung in position throughout the spaces to be illuminated would serve fully the purpose of my invention; but for present commercial practice it is best to use rigid lengths of tube and to fuse them together end to end. They may, however, be joined end to end in other ways. Suitable hooks or supports, which may be of simple construction and of limited cross-sectional area, as indicated at 8, could be used to support the tube. The terminal caps 3 of the tube are located in the box or receptacle 5, where they are attached to the terminals of the secondary of a transformer. The manner in which the ends of the tube may be disposed in the wall pocket or box is better illustrated in Fig. 4. The interior of said box is lined, preferably with a slate lining 13 or other good fire-proof insulating material, and upon the back plate are mounted suitable brackets 14, provided with clamps 15 to clamp and support the end or ends of the luminous tube. The conducting cap or terminal of the tube may be of any desired conducting material, preferably a composition of graphite or carbon, which may be applied as a paste and allowed to harden, after which metal conducting-rings to make connection therewith may be applied, as indicated at 16. Direct connection with these conducting-rings of metal is made from the terminals 17 of the transformer 6, as shown. Where the tube is of very considerable length and where conducting-caps are used for the terminals, I prefer to construct it so that it shall have an enlarged area in cross-section at its ends, where the conducting-caps are applied. This permits the luminous portion of the tube to be made of any desired size and length, while the non-luminous portions may be shortened up. By thus giving a larger cross-sectional area to the end of the tube I provide a larger surface for the application of the conducting-cap, which should be large with a long tube in order to permit the proper amount of energy to be transferred to and from the gaseous contents. The enlarged cross-sectional area may be obtained by attaching to each end of the luminous portion of the tube two or more branches each provided with the conducting envelop or cap, or, if desired, the bore of the tube may be enlarged, as shown in Fig. 9, where the cap is applied. When the tube terminates in separate tubes, as shown in Fig. 5, those which are connected with the same end of the tube are attached to the same terminals of the transformer, as clearly shown. In order to permit the luminosity of the tube to be varied at will, I make the conducting-caps in sections of any desired number, as indicated in Fig. 6, said sections being insulated from one another and connected, respectively, with contacts of a suitable switch, whereby any number of said sections may be connected at will to the transformer or other source of energy to permit the total area of cap to be varied, thereby varying the amount of energy to be transferred to and from the gaseous column. Any form of switch may be used for this purpose. In Figs. 7 and 8 I show a form of switch wherein the shaft 20, carrying a button 21, is provided with two arms of insulating material 22, to which in turn are attached conducting plates or brushes 23, each adapted to ride at the same time upon a continuous conducting-plate 24, connected to one terminal of the transformer or other source of energy and also upon or over a series of contacts 25, connected, respectively, to different sections of the sectional cap. The contacts 25 are mounted upon suitable base-plates 26. By turning the shaft 20 the number of contacts 52, joined to the feed-plates 24, may be varied at pleasure to vary the luminosity.

The form of illustrating-tube shown in Figs. 2 and 5 may be briefly stated as one in which the tube returns upon itself and has its two terminals located close together instead of being apart, as in the form shown in Fig. 1. By thus forming the tube it obviously becomes easy to isolate the source of energy-supply in a suitable protecting cabinet or box. This form lends itself particularly to use with transformers, which may be located in any desired position in a wall or ceiling pocket or receptacle and from which the tube may extend out over the spaces to be lighted and back on itself to said pocket or box, its exposed portions being entirely of glass or other translucent non-conducting material. Under those circumstances where it may be desirable to locate the box or receptacle 5 at some distance from those portions of the tube which are capable of giving useful illumination the tube may be protected for some distance by a casing 9, Fig. 2, of any suitable character, extending from the box to the points where the tube enters the space to be lighted.

Instead of using a casing 9 the portion of the tube extending from the terminals of the transformer to those portions which are intended for illumination might be made of conducting material, in which case said tube itself would be the conducting cap or terminal of the gas column to be rendered luminous.

When the tube contains a gas or vapor whose tension requires to be artificially modified, or, in other words, a gas which may need to have a particular degree of rarefaction or gaseous tension, it may be provided at some portion of its length convenient of access with a nipple, such as indicated at 10, for the application of a proper exhaust-pump. Also, if desirable, such nipples may be located at other points for the use of an exhaust-pump or for the introduction of the desired materials into the tubes. One of these is shown in detail in Fig. 3. They afford means whereby also the contents of the tube may be renewed as desired or the desired tension of vapor within the same reëstablished in case it should depart from the normal or critical density or tension best suited for the production of light. After the installation of the tube in the manner described the materials to be introduced into the tube and from which the gaseous column is produced are injected at the nipples 10 at various points. A suitable exhaust-pump is then applied to one end of the tube and the materials caused to distribute themselves by the suction thereof, or in some cases I may proceed by exhausting the tube and then injecting the material, which will automatically distribute itself throughout the same by the suction.

In a lamp of the construction wherein the energy is supplied by exterior caps or terminals the major portion of the consumption of energy takes place in the transfer of energy from the cap through the sealing glass wall of the contents. It is, however, desirable, for obvious reasons, to use glass tubing of considerable thickness for those portions of the tube which are exposed.

In order to eliminate as far as possible the waste of energy at the caps, I propose to construct the tubes, as indicated in the longitudinal section, Fig. 3, with a thickness of wall as small as possible at those points where the caps are applied and at which points the tube is protected against damage, and for the other portions, or those which are to inclose the actual light-radiating column, I use a greater thickness.

In the foregoing description I have assumed that the lamp is one wherein the gaseous column is excited to luminosity by energy supplied through exterior caps or conductors, this being the form which it is preferable to employ, inasmuch as no inferior pieces of metal exist which are liable in use to give off occluded gases and to thus interfere with the proper operation of the lamp. My invention, however, is not confined to this class of lamp, and the system may evidently be realized with lamps having other kinds of terminals, since the gist of my invention when high or dangerous potentials are used consists practically in distributing the gaseous light-radiating column throughout the area or interior to be illuminated and having the terminals thereof supplied with energy of considerable voltage located in a protective cabinet or wall-pocket, where said terminals are joined directly with any source of energy of proper character to render the gaseous contents luminous.

By my improved system of lighting it is possible to dispense with the use of distributing-wire through buildings or rooms, to install the light at much less cost than by the present incandescent system, to dispense with the use of armored piping or conduit and junction-boxes or moldings, fixtures, porcelain fuse cut-outs, flexible cords, sockets, and other lighting appliances now used for incandescent house-lighting. Moreover, as compared with the system before used by me, wherein tubes of, say, seven to eight feet in length and having conducting-caps are employed, at least forty per cent. less tubing is required, owing to the fact that a great total length of conducting-caps or other metals or parts obscuring the illuminating-column is dispensed with. For example, if a given illumination in a room emanates from twenty-five tubes the electricity is transferred to and from the gas at fifty places, while if one long tube is used it is transferred at only two places. The possibility of dispensing with caps and with a multiplicity of fixtures is also of advantage from an artistic standpoint, because it permits a practically unbroken or continuous line of light around, over, or through the area to be lighted, thus realizing the object sought for in electric illumination—namely, a perfect diffusion of light. Moreover, there is in my improved system a very great gain in efficiency, since, as I have discovered, the length of the illuminating-column may be greatly drawn out and the required density of light maintained without corresponding increase in the size of the caps or the amount of energy supplied to the lamps.

I have discovered that lamps of the character above described may be operated from street-mains carrying sinusoidal current of the ordinary commercial frequency—of, say, seven thousand two hundred alternations per minute—if the voltage be sufficiently raised. By the use of my invention it becomes possible to remove all objections involved in the distribution of high voltages, because said voltages may be confined to inclosures which may be amply protected. Furthermore, the invention permits the use of cap-surfaces of almost unlimited capacity. In addition, by the system herein described I dispense with the use of special generators, rotary transformers, spark-gaps, circuit-interrupters, and other special appliances, which have hitherto been considered absolutely essential for the production of allied phenomena from street circuits.

The system of illumination hereinbefore described presents radical and important features of difference over those electric-lighting systems which are at present in use and which have for many years tended to progress in a direction entirely wrong, because the lights were becoming brighter and brighter, while, as I have demonstrated, the right direction for improvement was to get a light that was less bright in spots, and therefore more like daylight—in fact a counterpart of daylight in, first, distribution or diffusion; second, color, and, third, temperature. For example, the incandescent lamp falls far short in these three most important points, while my improved lighting system hereinbefore described meets these requirements perfectly.

The invention claimed is—

1. In an electric-lighting system, a translucent non-conducting tube or receptacle containing a gas or vapor adapted to be rendered luminous when electrically agitated and disposed as described throughout the area or spaces to be illuminated and terminating at its ends in a suitable box or receptacle where it is provided with conducting caps or terminals adapted for connection to the source of electric energy used for rendering its gaseous contents luminous.

2. In a system of electric lighting, a translucent tube disposed or located through a room or rooms of a building and terminating at its ends in a box or receptacle where it is provided with suitable conducting caps or terminals and means whereby they may be protected or sealed against contact or disturbance and connected to a suitable source of electric energy, said tube containing only a rarefied gas or vapor adapted to be rendered luminous when agitated electrically by the energy supplied to said caps or terminals.

3. In a system of electric lighting, a translucent tube disposed or located through a room or rooms of a building and terminating at its ends in a box or receptacle where it is provided with suitable conducting caps or terminals and means whereby they may be protected or sealed against contact or disturbance and connected to a suitable source of electric energy, said tube containing only a rarefied gas or vapor adapted to be rendered luminous when agitated electrically by the energy supplied to said cap or terminals.

4. In a system of electric lighting, a translucent tube disposed or located through a room or rooms of a building and terminating at its ends in a box or receptacle where it is provided with suitable conducting caps or terminals outside of said room or rooms, and means whereby they may be protected or sealed against contact or disturbance and connected to a suitable source of electric energy, said tube containing only a rarefied gas or vapor adapted to be rendered luminous when agitated electrically by the energy supplied to said caps or terminals.

5 An improved electric-lighting system comprising an alternating-current transformer supplied from a suitable alternating-current main combined with a sealed translucent tube of glass containing the light-radiating vapor and having its two metallic electrodes located in immediate connection with the terminals of the secondary of said transformer, while its radiating or light-giving portion is distributed through or over the space to be illuminated.

6. In a high-potential system of electric lighting, an electric lamp consisting of lengths of glass tubing joined together *in situ* and forming substantially all of the high-potential circuit, said lamp having terminal sections provided with suitable conducting-electrodes connected with a source of energy proper for rendering the gaseous contents of the tube luminous.

7. In a high-potential system of electric lighting, an electric lamp consisting of lengths of glass tubing joined together and forming substantially all of the high-potential circuit, said lamp having terminal sections provided with suitable conducting-electrodes connected with a source of energy proper for rendering the gaseous contents of the tube luminous.

8. In an electric-lighting system, the combination of a tube of glass or other translucent material having a luminous or light-giving column of light-radiating gas of considerable length as compared with the length of the terminal, energy-supplying caps or electrodes, said tube being of a form which returns upon itself as described so as to bring said electrodes into proximity, and a suitable static transformer having its primary supplied with alternating current and having its secondary terminals connected to the tube caps or electrodes directly.

9. An electric lamp consisting of a tube of glass returned upon itself so that its ends will be brought into proximity to one another for the purpose described, said tube containing a rarefied gas adapted to be rendered luminous by the application of electric energy and being provided with conducting caps or electrodes applied upon its terminals, as and for the purpose described.

10. In an electric-lighting system, the combination substantially as described of lighting-tubes containing a rarefied gas or vapor and disposed or described through the area or spaces to be lighted, and alternating-current mains carrying currents of the usual commercial frequency, supplying energy to conducting-terminals of said tube located in a suitable protecting-inclosure, as and for the purpose described.

11. In an electric-lighting system, a translucent non-conducting tube or receptacle containing a gas or vapor adapted to be rendered luminous when electrically agitated and extending or prolonged through the area or spaces to be illuminated and terminating at its ends in conducting caps or terminals adapted for connection to the source of electric energy used for rendering its gaseous contents luminous.

12. In a system of electric lighting, a generator having its terminals inclosed in a protective casing and connected to the conducting-terminals of a lamp composed of a tube or inclosure of non-conducting translucent material containing a light-giving gas, the non-conducting portion only of said lamp being exposed while the conducting portions in union with the terminals of the generator are inclosed or protected in a similar manner to said terminals.

Signed at New York city, in the county of New York, State of New York, this 13th day of October, 1903.

DANIEL McFARLAN MOORE.

In presence of—

E. L. LAWLER,

C. T. TISCHNER, Jr.